(12) United States Patent
Song et al.

(10) Patent No.: US 8,817,125 B2
(45) Date of Patent: Aug. 26, 2014

(54) GESTURE RECOGNITION USING CHROMA-KEYING

(75) Inventors: Rong Song, Shanghai (CN); Jin Wang, Shanghai (CN); Yunqiang Liu, Shanghai (CN); Huanhuan Zhang, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 223 days.

(21) Appl. No.: 13/377,829

(22) PCT Filed: Jun. 23, 2010

(86) PCT No.: PCT/IB2010/052839
§ 371 (c)(1),
(2), (4) Date: Dec. 13, 2011

(87) PCT Pub. No.: WO2010/150201
PCT Pub. Date: Dec. 29, 2010

(65) Prior Publication Data
US 2012/0092519 A1    Apr. 19, 2012

(30) Foreign Application Priority Data

Jun. 25, 2009 (CN) .......................... 2009 1 0150894

(51) Int. Cl.
*H04N 5/228* (2006.01)
*G06K 9/20* (2006.01)
(52) U.S. Cl.
CPC .................................. *G06K 9/2027* (2013.01)
USPC ....................................................... 348/222.1
(58) Field of Classification Search
USPC ...................... 348/222.1, 234, 239, 370, 371; 345/168, 204, 589, 690; 382/165
See application file for complete search history.

(56) References Cited

U.S. PATENT DOCUMENTS

| 5,423,554 A | 6/1995 | Davis |
| 5,946,500 A * | 8/1999 | Oles .................................. 396/3 |

(Continued)

FOREIGN PATENT DOCUMENTS

EP    1879130 A2    1/2008

OTHER PUBLICATIONS

Darolti, C., et al.; A Fast Level-Set Method for Accurate Tracking of Articulated Objects with an Edge-Based Binary Speed Term; 2007; Lecture Notes in Computer Science; Springer; pp. 828-839.

(Continued)

*Primary Examiner* — Lin Ye
*Assistant Examiner* — Chriss Yoder, III

(57) ABSTRACT

A method and system for analyzing an object is provided in the present invention. The system comprises: a background arranged behind an object, wherein the color of the background is allowed to be selected from a set of colors; a first unit for setting a given color for the background so that the given color is different from the color of the object; a second unit for taking a picture including the object and the background; and a third unit for detecting at least one feature relating to the object according to the picture taken by said second unit. In the system, the color of the background is allowed to be set so as to be different from the color of the object. In this way, it is easy to distinguish the object part from the background part in the taken picture. This results in stable recognition for different objects, especially objects of different colors.

20 Claims, 3 Drawing Sheets

(56) References Cited

U.S. PATENT DOCUMENTS

| | | | |
|---|---|---|---|
| 6,674,485 B2* | 1/2004 | Akiyama et al. | 348/586 |
| 2002/0025066 A1* | 2/2002 | Pettigrew | 382/162 |
| 2003/0035061 A1* | 2/2003 | Iwaki et al. | 348/371 |
| 2004/0114193 A1* | 6/2004 | Inage et al. | 358/302 |
| 2007/0200938 A1* | 8/2007 | Kaku et al. | 348/239 |
| 2008/0193043 A1 | 8/2008 | Wilson | |

OTHER PUBLICATIONS

Han, D., et al.; Upper Limb Position Sensing: A Machine Vision Approach; 2005; Proc. of the 2nd Intl. IEEE EMBS Conf. on Neural Engineering; 4 pages.

Holmberg, B.; Towards Markerless Analysis of Human Motion; 2005; IT Licentiate Thesis; Uppsala University, Department of Information Technology.

Jaume-I-Capo, A., et al.; Real-Time Recognition of Human Gestures for 3D Interaction; 2008; Springer; pp. 421-427. http://www.springerlink.com/index/12250035225364M7.pdf.

Joyce, A. W., et al.; Implementation and capabilities of a virtual interaction system; 1998; Proc. of European Conf. on Disabilities, Virtual Reality and Assoc. Technologies; http://citeseerx.ist.psu.edu/viewdoc/download?doi=10.1.1.125.167&rep=repl&type=pdf.

Matusik, W., et. al.; Image-based 3D Photography using Opacity Hulls; 2002; ACM Transactions on Graphics; 21(3) 427-437.

Onneweer, B., et al.; Shooting for Chromakeying; 2001; http://library.creativecow.net/print.php?id=583.

Wikipedia the free encyclopedia; Chroma key; retrieved on Oct. 14, 2010; http://en.wikipedia.org/wiki/Chroma_key.

Zhou, H., et al.; Human motion tracking for rehabilitation—A survey; 2008; Biomedical Signal Processing and Control; 3(1)1-18.

* cited by examiner

GESTURE RECOGNITION USING CHROMA-KEYING

FIELD OF THE INVENTION

The present invention relates to an image processing technique, and particularly to utilizing the image processing technique to analyze an object.

BACKGROUND OF THE INVENTION

Apparatus for recognition of objects, such as human hand shapes, using image processing techniques is well known in the art, and several prior art systems exist which aim to recognize, e.g. different hand gestures, by using cameras and electronic processing apparatus. In such prior art systems, the pictures of objects are typically captured in front of a complicated background or a background of a fixed color. However, different objects might have different colors (e.g. due to different skin colors). If the color of the object is close to that of the background, it is difficult to provide accurate and stable recognition in the prior art systems. Because of this, these prior art systems have limited applications in the fields where high accuracy and good stability are required.

Therefore, it is needed to provide a technique for detecting and analyzing an object, such as human hands, with high accuracy and good stability.

SUMMARY OF THE INVENTION

It would be advantageous to provide a technique for detecting and analyzing different objects, especially objects of different colors, with high accuracy and good stability.

In accordance with the invention, a background is arranged behind an object to be analyzed, wherein the color of the background is allowed to be set so as to be different from that of the object. In this way, after a picture including the object and the background has been taken, it is easy to distinguish the object part from the background part in the picture. This results in stable recognition of different objects, especially objects of different colors.

According to an aspect of the present invention, there is provided a method and system for analyzing an object. The system comprises:
 a background arranged behind an object, wherein the color of the background is allowed to be selected from any one of a set of colors;
 a first unit for setting a color of the background so that said color is different from the color of the object;
 a second unit for taking a picture including the object and the background; and
 a third unit for detecting at least one feature relating to the object according to the picture taken by said second unit.

The advantage of such a system and method is that: it is very easy to distinguish the foreground (i.e. the object part) from the background in the pictures taken, since the color of the background is very different from that of the object. Further, in such a system, the color of the background can be set according to the color of the object. Thus, even if the object color varies due to one object being exchanged for another, the system is still able to reliably detect features regarding the object according to the pictures taken.

Preferably, the color selected for the background is different from that of the object in terms of chroma, luminance, or both. Such a system may have either a low-cost monochrome camera or a color camera as the second unit, dependent on the requirements.

Preferably, the color set for the background may be determined by a first module in the first unit. In an example, the first module may select a default color (e.g., green) as the background color. In another example, the background color may be determined based on a user input, wherein the user input indicates the background color the user wants to select. Such a system may be very simple and easy to operate. In a further example, the background color may be determined according to a detected color distribution of the object and a user input. Such a system may help the patient or the user to select a best-fit color as the color for the background so as to achieve a more accurate analysis of the object.

Preferably, the color distribution of the object may be automatically determined by performing the following steps:
 selecting, in sequence, a subset of colors for the background to generate a set of backgrounds of different colors;
 taking, for each background of said set of backgrounds, at least one picture including the object and the background;
 detecting the color distribution of the object, based on statistical analysis on the pictures taken for said set of backgrounds.

Such a system can automatically detect the color distribution of the object, so that the best-fit color for the background may be accurately determined without user intervention.

In a preferred embodiment, the object may be a part of the body (such as a human hand), and the system further comprises a fourth unit for recognizing a gesture of the part of the body, based on said at least one feature detected by the third unit. For example, the detected feature may be a silhouette of the part of the body. Such a system may accurately and stably detect the gesture of the part of the body for further analysis.

Furthermore, the system as mentioned above may be utilized as a rehabilitation system, and the object is a part of a patient's body (e.g. upper limb and hand). The rehabilitation system further evaluates whether the recognized gesture of the part of the body is correct, and then returns a feedback to motivate the patient via audio and/or video signals. In this way, such a system may be a home-based rehabilitation system to facilitate a patient in performing self-care motor relearning training automatically.

According to another aspect of the present invention, there is provided an apparatus for supporting the analysis of an object, the apparatus comprising:
 a background being intended to be arranged behind the object, wherein the color of the background is allowed to be selected from any one of a variety of colors;
 a first unit for configuring a color for the background so that the given color is different from the color of the object.

Such an apparatus may cooperate with a camera and a computing device to establish the rehabilitation system as mentioned above.

These and other aspects of the invention will be apparent from and elucidated with reference to the embodiment(s) described hereinafter

BRIEF DESCRIPTION OF THE DRAWINGS

The present invention will be described and explained hereinafter in more detail by means of embodiments and with reference to the drawings, wherein.

The same reference signs in the Figures indicate similar or corresponding features and/or functionalities.

DETAILED DESCRIPTION OF EMBODIMENTS

The embodiment of the present invention will be described hereinafter in detail with reference to the drawings.

The inventor of the present invention has found that it would be advantageous if the color of the background, which is arranged behind an object to be analyzed, can be set so as to be different from the color of the object. Since there is a big color difference between the object and the background, it is easy to distinguish between the object part of the picture including the object and the background.

Figure 1:
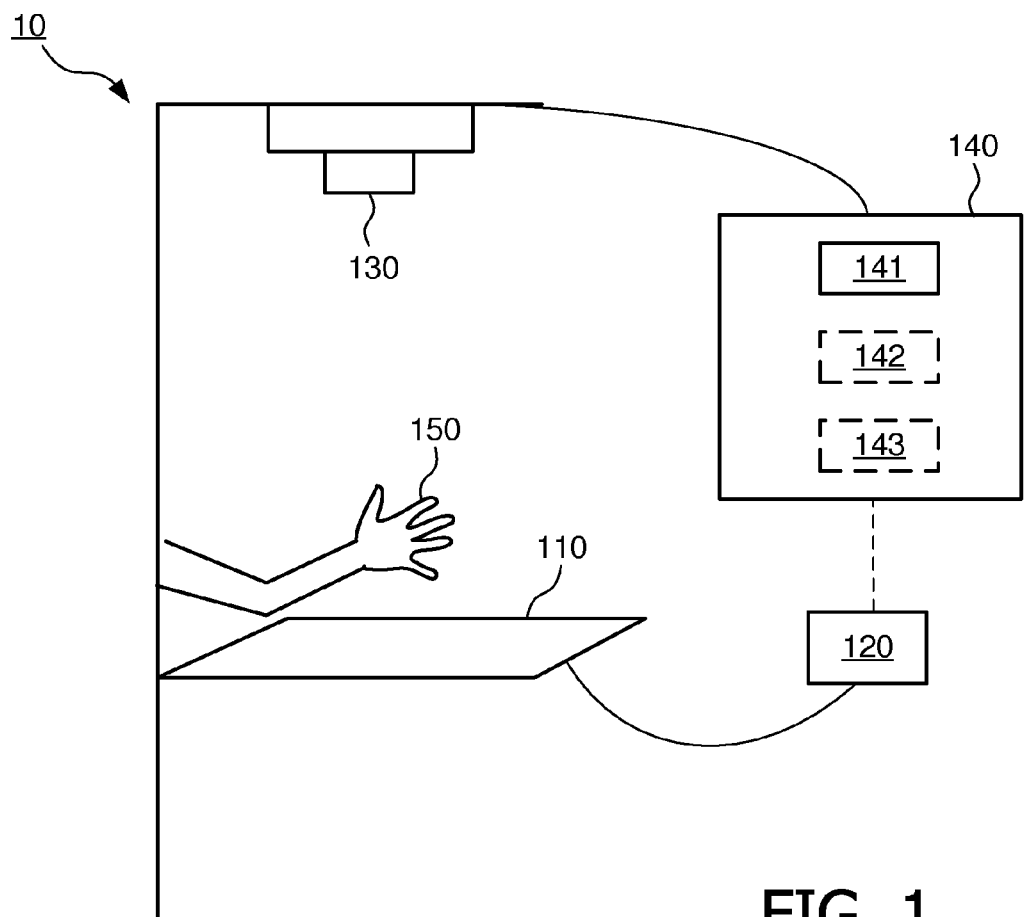
FIG. 1 is a schematic view of a system for analysis of an object according to an embodiment of the present invention.

FIG. 1 illustrates an exemplary system 10 for analyzing an object according to the above idea. The system 10 may be a recognition system of hand gestures or the like. As shown in FIG. 1, the system 10 comprises a background 110, a controller 120 (a first unit), a camera 130 (a second unit) and a processing unit 140, wherein the processing unit 140 includes e.g., detecting unit 141 (a third unit) and other optional function units 142 and 143 (which will be described hereinafter).

As shown in FIG. 1, an object 150 to be analyzed, such as a human hand, is placed between the background 110 and the camera 130. Herein, both the position and the height of the background 110 may be adjusted as desired, for example adjusted to fit different users. The camera 130 takes pictures including the object 150 and the background 110. The camera 130 may be a digital camera or a digital video camera. Camera 130 is coupled to the processing unit 140 via a wireless or wired connection, so that the pictures taken can be transferred from the camera 130 to the processing unit 140 for analysis. The processing unit 140 may be a laptop, a PDA, a cell phone, or any other electronic device having image processing capability. The processing unit 140 processes the received pictures to detect at least one feature regarding the object 150. The features of the object include position, size, outline or any other features that can be detected from the pictures.

In the embodiment of FIG. 1, the color of the background 110 can be selected from any one of a variety of colors. For example, the background 110 may be a LED lightboard, in which multiple LEDs are embedded. The color of the LED light board may be any one of 100 different colors with R.G.B values gradually increasing or decreasing. But the present invention is not limited to this; the number and types of background colors may be determined as required. The background 110 is not limited to a LED light board either, but may be a temp-control color-variable board or the like. Except for the color of the background, the texture of the background may be also selected or changed according to a user's preference, so that a user friendly interface may be provided.

In FIG. 1, controller 120 is coupled to the background 110 to select a given color for the background, the given color being different from the color of the object. The controller 12 may operate as a separate unit such as a remote-control unit, or may be integrated into either the background (if it is simple) or the processing unit 140. The given color selected for the background may be different from that of the object in terms of chroma, luminance, or both. For example, a color may be presented by the YUV or RGB format. In the YUV format, Y represents the luminance and U, V represent the chroma. Given that only the chroma of the object color (skin color) is considered, where U is 80-100 and V is 120-140, the given color for the background shall be far from the range of the object color, e.g. U and V of the given color are both about 230. In this way, there is a big color difference between the color of the object and that of the background. This color difference will be helpful to detect features (such as silhouette) regarding the object of the picture taken by camera 130.

Figure 2:
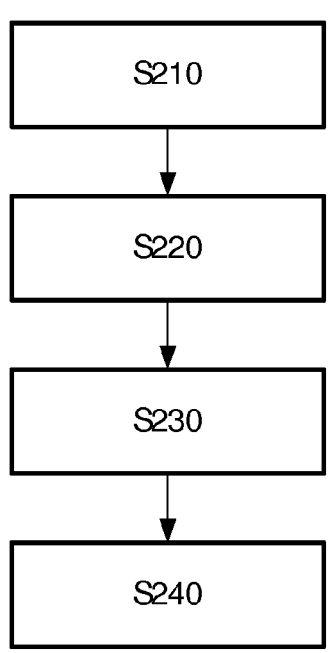
FIG. 2 is a flow chart of the operation procedure for the system of FIG. 1.

FIG. 2 shows an exemplary operation procedure of system 10. As shown in FIG. 2, at step S210, the system 10 is initialized, and an object 150 (e.g. human hand) is placed in front of the background 110. At step S220, the controller 120 sets the color of the background to a given color by sending a control signal to background 110. The given color is quite different from the color of the object. For example, the given color may be a default color such as green which is obviously different from the skin color of yellow people. The examples of the controller 120 will be described below in connection with FIGS. 3 and 4. At step S230, the camera 130 takes at least one picture including object 150 and the configured background 110. The picture taken is then transferred to the processing unit 140. The camera 130 takes pictures according to a command from the processing unit or the controller, or takes pictures continuously. At step S240, the detecting unit 141 in the processing unit 140 performs image processing on the received pictures to detect at least a feature regarding the object. Since the color of the background is very different from that of the object, it is easy for the detecting unit 141 to segment the object part from the picture taken, using known techniques. For example, the segmentation may be performed by using an automatically determined threshold. In the detecting unit 141, the segmented object part may be further processed to detect features regarding the object, such as position, size and silhouette of the object for further analysis (such as recognition). An exemplary procedure for detecting features will be described in detail below in connection with FIG. 5.

Figure 3:
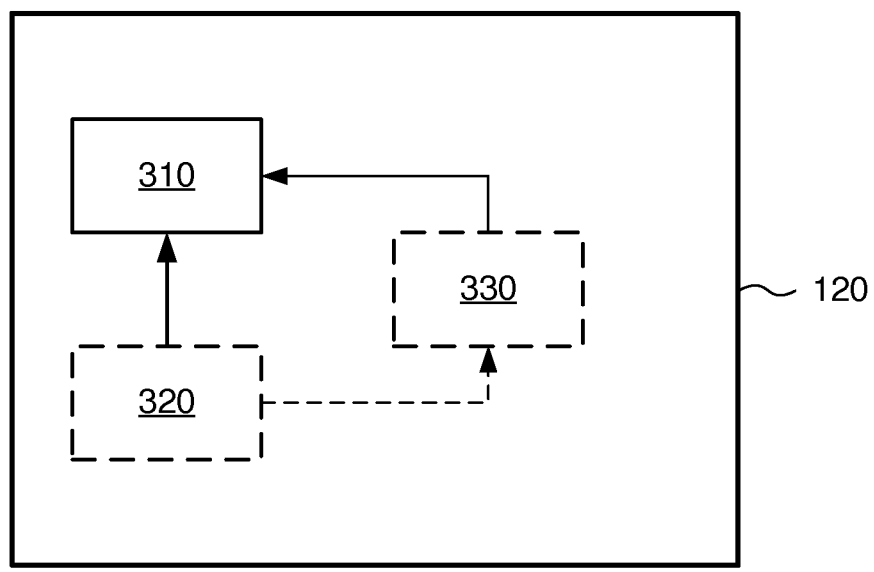
FIG. 3 is a block diagram of the controller in FIG. 1.

In FIG. 1, the controller 120 may be implemented in different ways. FIG. 3 shows some examples of the controller 120.

As shown in FIG. 3, the controller 120 includes a first module 310 for determining the given color for the background 110. For example, as mentioned above, during initialization, the first module may select a default color (e.g. green) as the given color for the background and set the background 110 to said color.

Also as shown in FIG. 3, the controller 120 further includes a user interface 320 to receive a user input. The user input directly indicates the background color that the user wants to select. In this case, the first module 310 determines the color that the user input indicates as the given color. This is a simple way, since the user can subjectively select a color for the background that is different from that of the object in most of cases.

In another example, the controller 120 further includes a second module 330 for detecting a color distribution of the object 150. In this example, the user input from the user interface 320 indicates the color of the object (e.g. the skin color and/or the color of the sleeve). Based on the user input, the second module 330 generates the color distribution of the object 150, and the given color is determined based on the color distribution in the first module 310. For example, the given color may be one of the 100 different colors having color distances from both the skin color and the sleeve color greater than a threshold. And, the bigger the color distance between the given color and each component in the color distribution of the object, the better the expected effect is.

In a further example, the controller 120 may include the first module 310 and the second module 330 only. In this example, the second module 330 automatically detects the color distribution of the object 150. This method is more adaptive to a situation with complicated object colors. An exemplary processing procedure is shown in FIG. 4.

Figure 4:
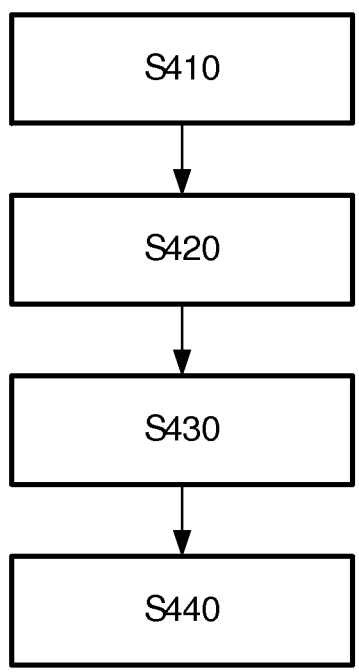
FIG. 4 is a flow chart of the automatic detection of the color distribution of the object according to an embodiment of the present invention.

As shown in FIG. 4, the procedure starts from step S410. At step S410, the background 110 is configured to present, in sequence, a set of colors (e.g. 100 different colors, or a subset of these colors), so that a set of backgrounds of different colors are generated. The step S410 may be performed by the second module 330 or by the first module 310 under the control of the second module. At step S420, for each of the backgrounds of different colors, the camera 130 takes at least one picture including the object 150 and the background under the control of the second module, so that a set of pictures of different background colors are taken. At step S430, the set of pictures are transferred to the second module 330 directly or via the processing unit 140. At step S440, the set of pictures are analyzed statistically to detect the color distribution of the object.

In an example, at step S440, R, G, B distribution for each picture of the set of pictures is calculated through a histogram. Herein, the color distribution of the object 150 can be achieved by a comparison of the calculated distributions, since it always has the same or a similar distribution. In a simpler example, the pictures taken are accumulated together in R, G, B dimensions. Since the background color of these pictures is changed within a large range while the object part thereof remains unchanged, there is a peak area in the histogram of the accumulated frames that is obviously higher than other areas, and the peak area corresponds to the color range of the object part, i.e. the color distribution of the object. After the color distribution of the object is detected, the given color for the background may be determined as the one that has maximal color distance from the center or the peak of the color distribution of the object.

FIGS. 1~4 illustrate some embodiments of the system 10. The system 10 may be utilized in different applications, such as a system for recognition of hand gestures. In the recognition system, the processing unit further includes a recognition unit 142, for recognizing a gesture of a user's hand based on the features detected by the detecting unit 141. The system 10 may be further applied to other systems such as product classification systems or the like.

Figure 5:
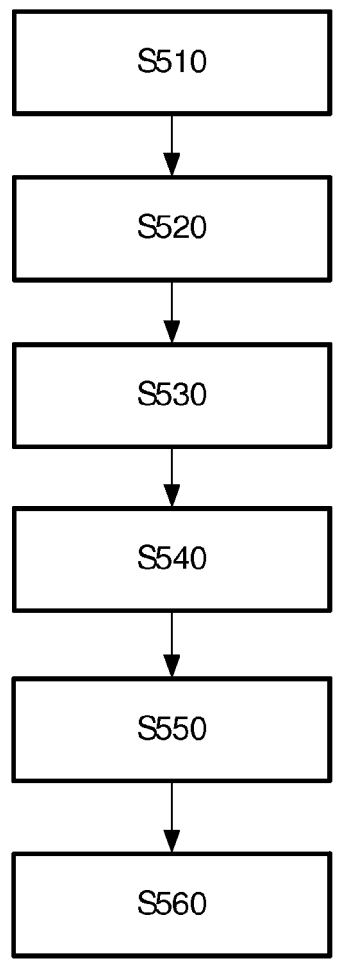
FIG. 5 is a flow chart of the operation procedure for a rehabilitation system according to an embodiment of the present invention.

FIG. 5 shows an embodiment where the system 10 of FIG. 1 is utilized as a rehabilitation system. A rehabilitation system is a system to help patients who have motor function impairment, restore their lost functions. Prior rehabilitation systems include an electrical stimulation (FES) system, robotics, etc. But these rehabilitation systems are expensive and complex, which limits their applications at home. Therefore, in this embodiment, a low-cost, home-based rehabilitation system is provided for patients to perform self-care motor relearning training, e.g. on upper limb and hand.

In this embodiment, the system 10 of FIG. 1 is operated as a rehabilitation system. In the rehabilitation system, processing unit 140 further includes a commanding unit (not shown), for ordering the patient to perform a certain action via audio or video signals. Besides, the processing unit 140 further includes the recognition unit 142 as mentioned above and a judging unit 143. The judging unit 143 judges whether the gesture recognized by unit 142 is correct, and returns a feedback signal to motivate the patient. In addition, the processing unit 140 further includes a display to show the pictures taken in real time.

Figure 6:
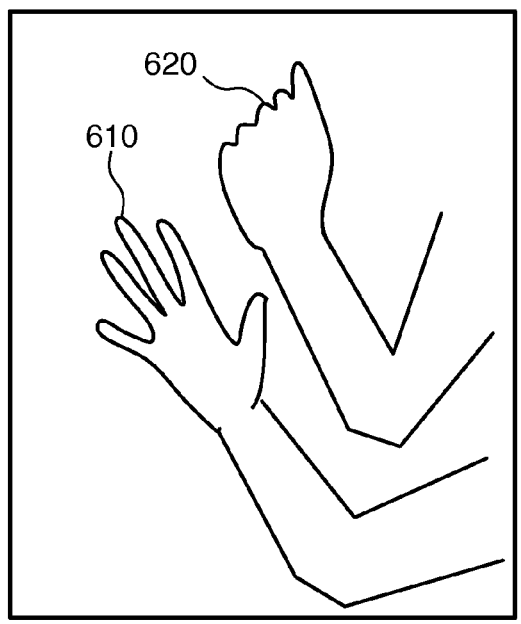
FIG. 6 is a schematic view of the silhouettes obtained according to an embodiment of the present invention.

FIG. 5 illustrates an exemplary operation procedure of the rehabilitation system. As shown in FIG. 5, at step S510, a patient is asked to place his upper limb and hand, as the object 150, between the background 110 and the camera 130 and perform a certain action (e.g. clenching his fist) when he is requested to do so. At step S520, according to the procedure of FIGS. 2~4, the color of the background is selected so as to be different from e.g. the skin color and sleeve color of the patient. At step S530, in the same way as shown in FIG. 2, the camera 130 takes a picture including the patient's upper limb and hand as well as the background, so as to capture the situation of the upper limb and hand. At step S540, the picture is transferred to the detecting unit 141 in processing unit 140 to detect features of the upper limb and hand. For example, at step S540, an algorithm of getting a geometric center or an erosion method is used to detect a center position of e.g. the hand, after the upper limb and hand part, i.e. the object part, is segmented. The center position represents the position of the object, and thus it may be used as a reference. Moreover, at step S540, the segmented object part, i.e. the part of the upper limb and hand, is further filtered by a high-pass filter (e.g., using a Sobel operator) to obtain the silhouette of the upper limb and hand. Preferably, the obtained silhouette may be further de-blurred to cancel the blurring effects in the silhouette. In cases where clear edges are of significant importance, the de-blurring method is helpful. FIG. 6 shows two silhouettes 610 and 620 of the upper limbs and hand that are obtained from at least two pictures taken in sequence according to the above method.

Next, at step 550, recognition unit 142 further processes the detected features (including position and/or silhouette) to recognize the gesture that the patient made. For said recognition use can be made of various methods. For example, the gesture of the upper limb may be preliminarily recognized based on the detected center position and the angle between the upper arm and forearm as indicated by the detected silhouette. Preferably, an artificial neural network (ANN) or maximum likelihood estimator may be applied in step S550. For an ANN algorithm, the input to the ANN may be features of the detected silhouette, such as feature points on the silhouette (extreme points or inflection points), mean or standard deviation of the distance between the center position and each point of the silhouette. The output of ANN identifies the recognized gesture, such as hand open 610 and hand closed 620 in FIG. 6. At step S560, the judging unit 143 judges whether the recognized gesture matches a pre-defined right one, and gives a feedback signal based on the result of the judgment, such as a reward. Under this motivation, the patient may keep performing the self-care motor relearning training. Alternatively, a plurality of such rehabilitation systems may be connected to a rehabilitation center via a network. The doctor in the rehabilitation center may remotely help two or more patients perform relearning training at the same time.

While the invention has been illustrated and described in detail in the drawings and foregoing description, such illustration and description are to be considered illustrative or exemplary and not restrictive; the invention is not limited to the disclosed embodiments. For example, the present invention may be applied to recognize lower limbs or other parts of the body, or to recognize space gesture of a certain device. Alternatively, the present invention may be applied in product classification or other fields for the analysis of an object.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A system for analyzing an object, comprising:
    a background unit positioned behind the object to provide a background for the object, the color of the background unit being selectable from any one of a set of colors;
    a controller configured to automatically:
        detect a color distribution of the object;
        determine a color from the set of colors for the background based on the detected color distribution of the object, the color being different from the color of the object; and
        set a color of the background to the determined color;
    a camera configured to take a picture including the object and the background set to the determined color; and
    a processing unit configured to detect at least one feature relating to the object according to the picture taken by said camera.

2. The system according to claim 1, wherein the determined color is different from the color of the object in chroma and/or luminance.

3. The system according to claim 1, wherein the controller is further configured to:
    set the background to each of a plurality of the set of colors while the object remains constant in color;
    control the camera to take a picture of the object with each of the plurality of the set of colors; and
    set the color with the greatest difference in distribution from the color of the object as the background color.

4. The system according to claim 1, wherein the controller is further configured to:
    set the background to each of a plurality of the set of colors while the object remains constant in color;
    control the camera to take a picture of the object with each of the plurality of the set of colors;
    accumulate the pictures in red (R), green (G), blue (B) distributions; generates a histogram of a color distribution of the accumulated pictures; locate a peak area of the histogram;
    estimate a color which is a maximal distance from the peak area; and
    set the color which is the maximal distance from the peak area as the background color.

5. The system according to claim 1, wherein the controller is configured to:
    segment the object from the background within the picture.

6. The system according to claim 4, wherein the controller further including:
    a user interface for receiving a user input; and
    wherein said controller is configured to select the color based on the detected color distribution of the object and the user input.

7. The system according to claim 1, wherein the object is a part of a body, the processing unit is further configured to:
    recognize a gesture of the part of the body based on said detected at least one feature.

8. The system according to claim 7, wherein the object is a patient and further including:
    a commanding unit configured to order the patient to perform a particular gesture; and
    wherein the processing unit is configured to judge whether the recognized gesture correctly conforms to the commanded particular gesture and provide feedback to the patient.

9. The system according to claim 7, further including:
    a display configured to display the pictures taken by the camera in real time.

10. An apparatus for supporting the analysis of an object, comprising:
    a background unit arranged behind the object to provide a background behind the object, wherein the color of the background is selectable from any one of a set of colors;
    one or more computer processors configured to:
        control the color of the background;
        set the background to each of a plurality of the set of colors while the object remains constant in color;
        control the camera to take a picture of the object with each of the plurality of the set of colors; and
        detect a color distribution of the object;
        set the color with the greatest difference in distribution from the color of the object as the background color.

11. An apparatus according to claim 10, wherein the one or more computer processors are further configured to:
    determine a color from the set of colors for the background based on the detected color distribution of the object, the color being different from the color of the object.

12. An apparatus according to claim 10, wherein the one or more computer processors are further configured to:
    accumulate the pictures in red (R), green (G), blue (B) distributions;
    generates a histogram of a color distribution of the accumulated pictures;
    locate a peak area of the histogram;
    estimate a color which is a maximal distance from the peak area; and
    setting the color which is the maximal distance from the peak area as the background color.

13. The apparatus of claim 10, wherein the background unit is a board embedded with at least one LED.

14. The apparatus according to claim 10, further including:
    a commanding unit configured to order a patient to perform a particular action;
    a recognition unit configured to recognize a gesture of a part of a body of the patient based on at least one feature detected by the one or more computer processors; and
    a judgment unit configured to judge whether the gesture recognized by the processing unit is correct.

15. A method for analyzing an object, comprising steps of:
    providing a background unit arranged behind the object, the color of the background being configured selectable to any one of a set of colors;
    automatically setting the background to be in a color of the set of colors, the color being different from the color of the object, wherein the color is automatically set in response to detection of a color distribution of the object;
    taking a picture including the object and the background set to the color; and
    performing image analysis to detect at least one feature relating to the object according to the taken picture.

16. A method according to claim 15, said method further including:
- setting the background to each of a plurality of the set of colors while the object remains constant in color;
- controlling a camera to take a picture of the object with each of the plurality of the set of colors; and
- setting the color with the greatest difference in distribution from the color of the object as the background color.

17. A method according to claim 16, wherein determining said color further includes:
- segmenting the object from the background within the picture to detect a color distribution of the object.

18. A method according to claim 15, wherein determining said color further includes:
- setting the background to each of a plurality of the set of colors while the object remains constant in color;
- controlling a camera to take a picture of the object with each of the plurality of the set of colors;
- accumulating the pictures in red (R), green (G), blue (B) distributions;
- generating a histogram of a color distribution of the accumulated pictures;
- locating a peak area of the histogram;
- estimating a color which is a maximal distance from the peak area; and
- setting the color which is the maximal distance from the peak area as the background color.

19. The method according to claim 18, further including:
- ordering a patient to perform a particular action; and
- wherein the detected at least one feature relating to the object is detected according to a segmented portion of the picture corresponding to the object.

20. The method according to claim 19, further including:
- recognizing a gesture of a part of a body the patient based on said at least one detected feature; and
- judging and providing feedback whether the recognized gesture is correct.

* * * * *